No. 745,931. PATENTED DEC. 1, 1903.
J. L. TIMMONS.
MACHINE FOR HARVESTING AND CLEANING ROOT CROPS.
APPLICATION FILED MAR. 20, 1903.
NO MODEL. 3 SHEETS—SHEET 1.
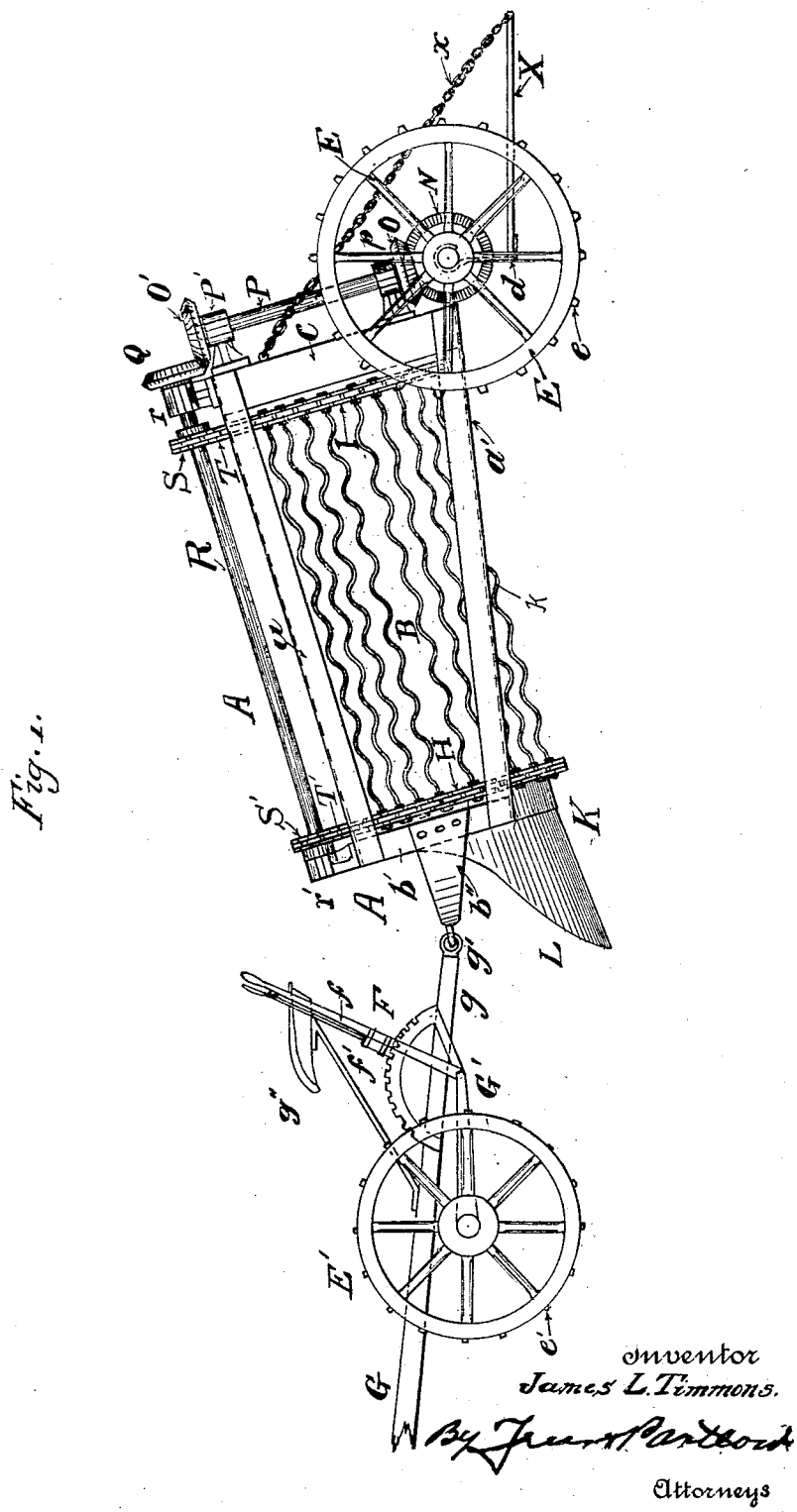
Witnesses
Wm Boyd
E. B. Clark
Inventor
James L. Timmons.
By [signature]
Attorneys

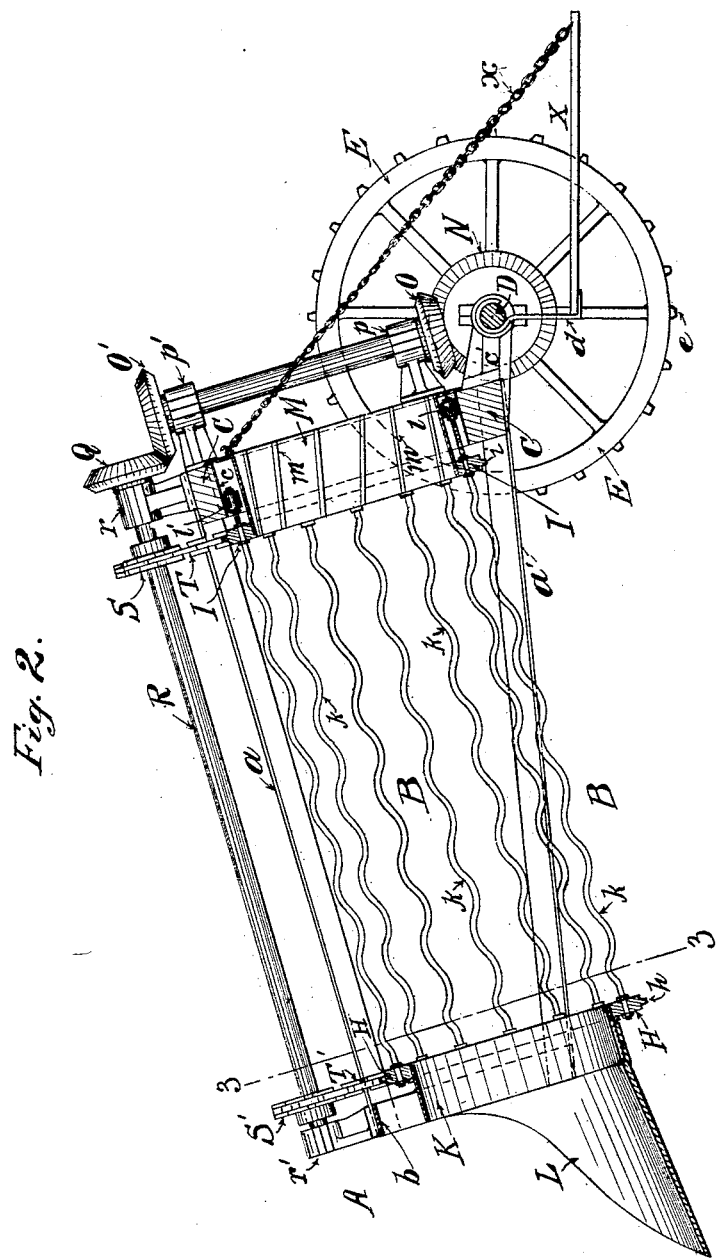

No. 745,931. PATENTED DEC. 1, 1903.
J. L. TIMMONS.
MACHINE FOR HARVESTING AND CLEANING ROOT CROPS.
APPLICATION FILED MAR. 20, 1903.
NO MODEL. 3 SHEETS—SHEET 3.
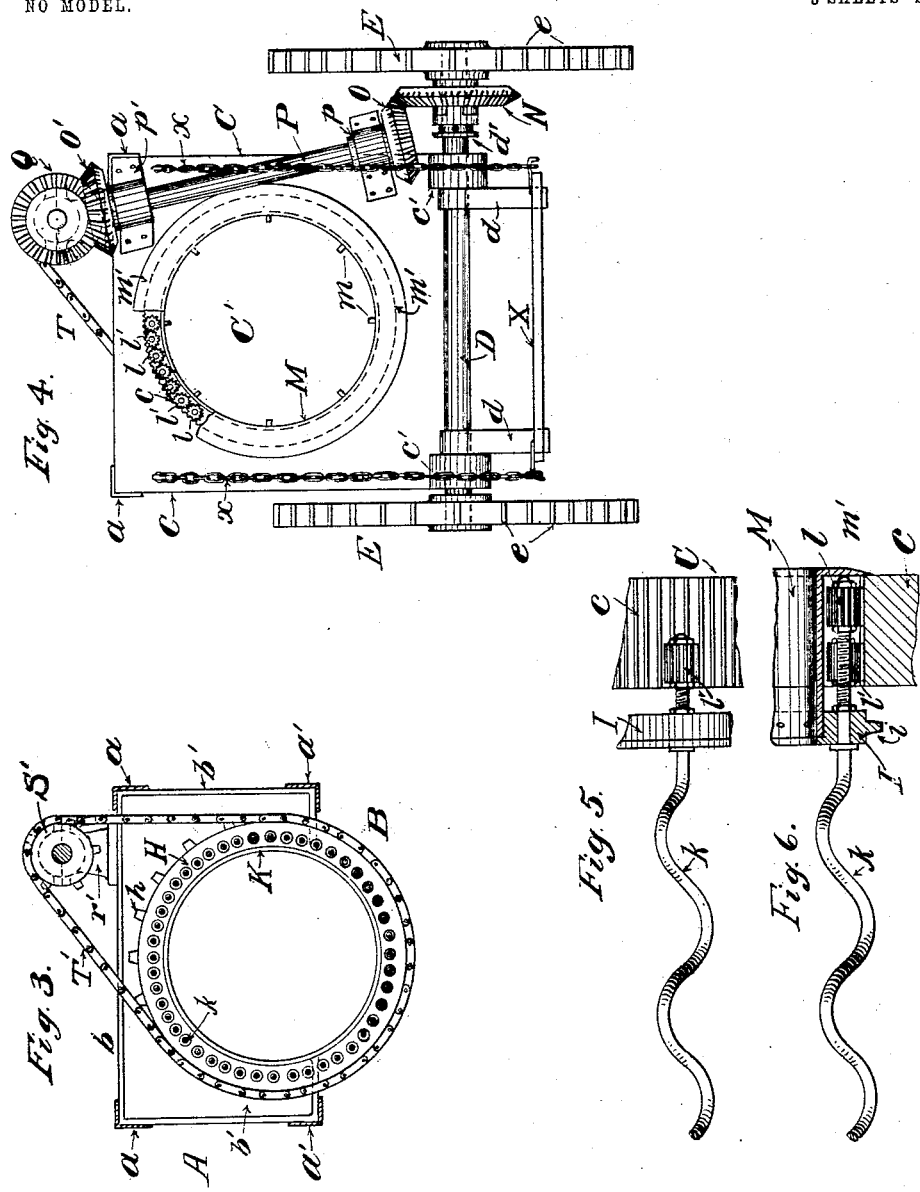
Witnesses
Wm Boyd
E. B. Clark
Inventor
James L. Timmons.
By [signature]
Attorneys No. 745,931. Patented December 1, 1903.

UNITED STATES PATENT OFFICE.

JAMES L. TIMMONS, OF EDWARDSVILLE, KANSAS.

MACHINE FOR HARVESTING AND CLEANING ROOT CROPS.

SPECIFICATION forming part of Letters Patent No. 745,931, dated December 1, 1903.

Application filed March 20, 1903. Serial No. 148,667. (No model.)

*To all whom it may concern:*

Be it known that I, JAMES L. TIMMONS, a citizen of the United States, residing at Edwardsville, in the county of Wyandotte and State of Kansas, have invented new and useful Improvements in Machines for Harvesting and Cleaning Root Crops, of which the following is a specification.

This invention relates to a revoluble cleaning and conveying cylinder adapted for use in a machine for harvesting and cleaning root crops or such vegetable products as are dug from the ground, including potatoes, onions, peanuts, beets, and other roots, and for other purposes.

The special object of my invention is to provide for more effectively and rapidly cleaning the soil from the potatoes or roots and by agitating devices break up and pulverize the soil and cause it to be sifted out and discharged separately, while the vegetables are conveyed backward by the same agitating devices and discharged at the rear end of a revolving cylinder.

The devices and combinations thereof constituting my invention will be defined in the claims.

I will now describe the details of construction and operation of my improved machine by reference to the accompanying drawings, in which—

Figure 1 represents a side elevation of the machine. Fig. 2 represents a longitudinal vertical section of my revoluble cleaning and conveying cylinder and certain shafts and gearing in elevation. Fig. 3 represents a vertical transverse section of the same on line 3 3 and looking toward the front of the cylinder. Fig. 4 represents a rear end elevation with parts broken away. Fig. 5 represents a detail view, on enlarged scale, showing one of the spirally-twisted agitating-rods of the cleaning-cylinder and its operating-gears. Fig. 6 represents a sectional detail view of similar parts and a protecting-collar.

Among the distinguishing features of my digger and harvester the most important are the spirally-twisted revoluble agitating-rods, which form the circumferential portion of the cleaning-cylinder and which serve not only to disintegrate the soil and facilitate the operation of sifting it out, but also to traverse or convey the cleaned potatoes or roots back to the discharging end of the cylinder.

In constructing my harvester and cleaner I make a supporting-frame A for the cleaning-cylinder of iron bars, preferably longitudinal angle-iron bars $a$ and $a'$, respectively, at the top and bottom, the transverse top bar $b$ and the upright side bars $b'$ at the front end, as shown in Figs. 1 and 3, and the rear end plate C, as shown in Figs. 1 and 4. The parts of the frame are suitably bolted or riveted together to make a strong rigid frame, in which is mounted the revoluble cleaning and conveying cylinder B. The rear end plate C is made of thick strong metal, as indicated in Figs. 2, 5, and 6, and is provided with a large central opening $C'$, the circumferential edge of which is toothed at $c$ to form the main operating-gear for the numerous pinions on the spirally-twisted agitating-rods in the cleaning-cylinder B, as indicated in Figs. 5 and 6. The plate C is provided at its lower edge with the rearwardly-projecting lugs $c'$, Figs. 2 and 4, having journal-bearings for the turning-axle D, having secured to its outer ends the power-wheels E. These wheels are provided with the circumferential teeth $e$ for taking into the earth and preventing the wheels from slipping as the harvester is propelled forward. A front truck, having two wheels $E'$, is provided for supporting the tongue, reach, and connections for the cleaning-cylinder. The tongue G and rearwardly-extending reach $g$ are suitably supported on the crank-axle $G'$ of the truck, and the reach is provided at its rear end with an eye $g'$ for engaging with a hook on the yoke $b''$, which is secured to the front end of the frame A.

A driver's seat $g''$ is suitably mounted on the tongue G. A toothed segment F is rigidly secured to the tongue, and a lever $f$ is rigidly secured to the crank-axle and is provided with a spring-latch $f'$ for engaging with the notches of the segment. By properly operating the lever $f$ the scoop or shovel L, connecting with the frame of the cylinder B, will be raised or lowered and properly adjusted for scooping up the potatoes and soil or for raising them out of the soil when no work is to be done. The wheels $E'$ are also provided with peripheral teeth $e'$.

The revoluble cleaning-cylinder B is constructed of the front and rear sprocket-rings H and I, provided, respectively, with peripheral teeth $h$ and $i$ and the connecting agitating-rods $k$. A circular supporting collar or ring K is rigidly secured to the front frame-bars $b'$ and serve as a bearing for the sprocket-ring H. In practice the ring H will be fitted to turn in a circular groove formed on the collar K and may have ball-bearings or rollers to overcome friction and produce easy rotation of the cylinder. The connecting-rods $k$ are about one-half inch in diameter and are twisted or wound to form long spiral curves which would describe circles about three inches in diameter, and they are loosely supported in holes in the sprocket-rings H and I, so as to independently turn therein as the rings are revolved. In practice the rods $k$ are set as close together as shown in Fig. 3; but for the sake of simplicity and clearness they are shown wider apart and at irregular intervals in Figs. 1 and 2. They will in practice be set far enough apart to permit the dirt or soil to be sifted out and the potatoes to be sorted. The front and rear ends of the rods are held against endwise movement in the sprocket-rings by suitable nuts and lock-nuts, as indicated in the drawings. The rear ends of the rods $k$ are provided alternately with the outer and inner pinions $l$ and $l'$, rigidly secured in place by nuts or other means, as indicated in Figs. 5 and 6, and arranged to engage with the long teeth $c$ on the interior circular edge of the plate C. The object of setting the pinions alternately outward and inward—that is, on alternately longer and shorter rods—is to prevent them from engaging one with another. The pinions $l$ and $l'$ all engage with the long teeth $c$, and therefore all turn in the same direction, causing the spiral twists or turns therefore to act as conveyers for the potatoes or roots. The sprocket-ring I will be of suitable diameter, and the rods $k$ will be so set therein as to cause the whole circle of pinions to bear upon the circular edge of the plate C and engage with all of the teeth $c$ on such edge at the same time. In order to protect the teeth $c$ and the pinions $l\,l'$ from dirt, I secure a circular shield M to the interior of the sprocket-ring I and provide said shield with an outwardly-turned flange $m'$, which overlaps the inner edge of the plate C, as shown in Figs. 4 and 6. Diagonal teeth or ribs $m$ are formed on or applied to the interior surface of the shield M for facilitating the discharge of potatoes or roots as the cylinder revolves.

The gearing for the cleaning-cylinder and the spiral agitating-rods thereof is operated by the power-wheels E. To the revoluble axle D is loosely applied the beveled gear-wheel N and the sliding clutch $d'$, which is engaged by a key or feather on the shaft and adapted to be engaged with the hub of said wheel by shifting it in a well-known manner. An upright or inclined shaft P, supported in the bearings in the brackets $p$ and $p'$, has secured to its lower and upper ends the beveled gears O and O', the lower one of which meshes with the gear N, while the upper one meshes with the beveled gear Q, secured to the outer end of the shaft R. This shaft is supported in the journal-boxes $r\,r'$, which are secured to the top of the frame A, and has secured near its opposite ends the sprocket-wheels S and S'. The sprocket-chains T and T' are passed over these wheels and around the sprocket-rings I and H, as shown in Figs. 2 and 3, for revolving the cleaning-cylinder B.

A platform X is supported at the rear end of the harvester by the hangers $d\,d$ on the axle D and the chains $x\,x$ and affords a place for workmen to stand on while placing potatoes or roots in sacks or other receptacles. The chains $x\,x$ engage with hooks on the platform and on the upper end of the plate C, as shown in Figs. 2 and 4. The platform can be readily folded up out of the way.

Though I have described a convenient and simple construction and arrangement of the harvesting-machine as shown in the drawings, I wish it understood that my invention is not confined to the details of construction illustrated, but may be varied and added to in many of its features without departing from my invention.

The harvesting-machine having been constructed as shown and above described and placed in position over the row of potatoes, onions, or roots, the driver lowers the plow or scoop L into the proper position to scoop up the vegetables and soil and direct them into the cylinder B as the machine is drawn over the field. The machine being started, the cleaning-cylinder will be revolved through the medium of the gearing and sprocket-chain T T', and at the same time the pinions $l\,l'$ will by engagement with the teeth $c$ be separately turned all in the same direction, thereby turning the spirally-twisted agitating and conveying rods $k$. By this combined action of the revolving cylinder and the turning-rods the mass of soil and potatoes or roots is tumbled and shaken up so as to rapidly disintegrate the soil and thoroughly clean it from the vegetables and cause it to be sifted out, while at the same time the vegetables are gradually conveyed back by the revolving spiral rods and discharged at the rear open end of the cleaning-cylinder, where they are deposited in sacks and otherwise cared for by the attendant on the rear platform.

Having described my invention, what I claim, and desire to secure by Letters Patent, is—

1. The combination with a frame, of a revoluble cleaning-cylinder constructed with spirally-twisted agitating and conveying rods and gearing for revolving the cylinder and separately turning said rods substantially as described.

2. The combination with a frame, of a revoluble cleaning-cylinder constructed with front and rear sprocket-rings, agitating-rods arranged to turn in openings in said rings and having pinions at one end, a main fixed operating-gear having a toothed interior edge with which said pinions engage, an interior supporting-collar acting as a bearing for the front sprocket-ring, a shaft having sprocket-wheels and sprocket-chains passing over said wheels and around said rings, substantially as described.

3. The frame constructed with the fixed rear end plate having a large circular opening and provided with teeth on its inner edge, in combination with the revoluble cylinder composed of front and rear sprocket-rings, connecting-rods having agitating devices and mounted to separately turn in said rings, pinions on the end of said rods engaging with the teeth on the inner edge of said end plate, means for supporting the front end of said cylinder and operating-gearing substantially as described.

4. The combination with a frame, of the cleaning-cylinder constructed with front and rear sprocket-rings, a series of circumferential rods arranged to turn in their bearings in said rings and means for simultaneously turning said cylinder and its rods in their bearings, substantially as described.

5. The combination with a frame and a fixed interiorly-toothed gear at the rear end thereof, the cleaning-cylinder having a circumferential series of turning-rods provided with pinions engaging with said fixed gear and an interior circular shield covering said pinions and gear, substantially as and for the purpose described.

6. The revoluble cleaning and conveying cylinder constructed with a circumferential series of spirally-twisted rods arranged to turn in bearings, in combination with means for separately turning both the cylinder and the rods, substantially as described.

In testimony whereof I affix my signature in presence of two witnesses.

JAMES L. TIMMONS.

Witnesses:
BENJAMIN A. TROWBRIDGE,
JOHN B. CLARK.